United States Patent [19]

Kane et al.

[11] Patent Number: 4,518,893

[45] Date of Patent: May 21, 1985

[54] CRT WITH INTERNAL NECK COATING OF CRYSTALLINE TIN OXIDE FOR SUPPRESSING ARCING THEREIN

[75] Inventors: James Kane, Lawrenceville; John Murr, Jr., Allentown, both of N.J.

[73] Assignee: RCA Corporation, Princeton, N.J.

[21] Appl. No.: 443,921

[22] Filed: Nov. 23, 1982

[51] Int. Cl.[3] .......................... A01J 29/88; B05D 5/12

[52] U.S. Cl. .......................................... 313/479; 427/64

[58] Field of Search ............................ 313/479; 427/64

[56] References Cited

U.S. PATENT DOCUMENTS

| | | | |
|---|---|---|---|
| 3,138,734 | 6/1964 | Lineweaver | 313/291 |
| 3,355,617 | 11/1967 | Schwartz et al. | 313/82 |
| 3,758,802 | 9/1973 | Kubo et al. | 313/64 |
| 3,979,632 | 9/1976 | Gunning et al. | 313/479 |
| 4,249,107 | 2/1981 | Kilichowski | 313/479 |
| 4,265,974 | 5/1981 | Gordon | 428/432 |
| 4,285,990 | 8/1981 | Hernqvist | 427/39 |

*Primary Examiner*—Palmer Demeo
*Assistant Examiner*—Sandra L. O'Shea
*Attorney, Agent, or Firm*—Eugene M. Whitacre; Dennis H. Irlbeck; LeRoy Greenspan

[57] ABSTRACT

CRT (cathode-ray tube) comprises an evacuated glass envelope, an electron-gun mount assembly housed in the envelope, the electrodes of said envelope being confined by closely-spaced glass surfaces, and a smooth, electrically-conductive coating of tin oxide on said glass surfaces opposite electrodes of said mount assembly. The electrically-conductive coating is electrically floating and, preferably, is a substantially-continuous circumferential band on the inner surface of the neck of the CRT.

9 Claims, 4 Drawing Figures

CRT WITH INTERNAL NECK COATING OF CRYSTALLINE TIN OXIDE FOR SUPPRESSING ARCING THEREIN

BACKGROUND OF THE INVENTION

This invention relates to a novel CRT (cathode-ray tube) having internal means for suppressing arcing therein during the operation thereof; and particularly for suppressing flashovers in the glass neck of a CRT having an electron-gun mount assembly housed therein.

A color television picture tube is a CRT which comprises an evacuated envelope including a viewing window that carries a luminescent viewing screen thereon, and a glass neck that houses an electron-gun mount assembly therein. During the operation of the tube, the mount assembly produces one or more electron beams for selectively scanning the viewing screen so as to produce a viewable video image thereon. During the operation of the tube, an excessive amount of stray or uncontrolled electron emission and electrical leakage sometimes develops within and/or around the structure of the mount assembly. This condition may result in flashovers, a form of arcing, which may degrade the performance of the tube and/or may be destructive of the tube and/or associated circuitry. Excessive stray or uncontrolled electron emission, leakage and arcing are a result of a combination of factors involving the electrodes and the closely-spaced glass surfaces of the neck.

Various coatings on the internal surfaces of the neck of the tube have been suggested for suppressing such arcing. U.S. Pat. No. 3,355,617 to J. W. Schwartz et al. discloses an internal, electrically-resistive coating of iron oxide or a mixture of oxides of iron and manganese. U.S. Pat. No. 3,758,802 to T. Kubo et al. discloses an internal, electrically-insulative coating of crystallized glass. U.S. Pat. No. 3,979,632 to E. A. Gunning et al. discloses an internal coating of insulative chromic and/or ferric oxide. U.S. Pat. No. 4,285,990 to K. G. Hernqvist discloses an internal, electrically-conductive coating of chromium metal. While each of these internal neck coatings may have a beneficial effect in some tube designs, the beneficial effect has not been great enough to find much commercial use. Some of these coatings are made by processes that are not practical for commercial manufacturing, or are inferior in suppressing arcing. Because of the fabrication process used, some coatings are too thick, causing spalling of the neck glass during subsequent processing. Also, with some coatings, when the tube is electrically processed by spot knocking, undesirable particles of the coating may be released into the tube and may interfere with its proper performance.

SUMMARY OF THE INVENTION

The novel CRT is similar in structure to prior tubes except that there is a smooth electrically-conductive coating of tin oxide on the internal glass surfaces of the neck opposite electrodes of the mount assembly. The tin-oxide coating is a continuous film, preferably in the form of a circumferential band, that is floating electrically. The coating is sufficiently thin to avoid spalling of the glass and is tapered in thickness at least at one edge to reduce electron emission therefrom. The coating is resistant to abrasion and electrical processing and may be made by commercially-attractive processes.

DETAILED DESCRIPTION OF THE PREFERRED EMBODIMENT

Figure 1:
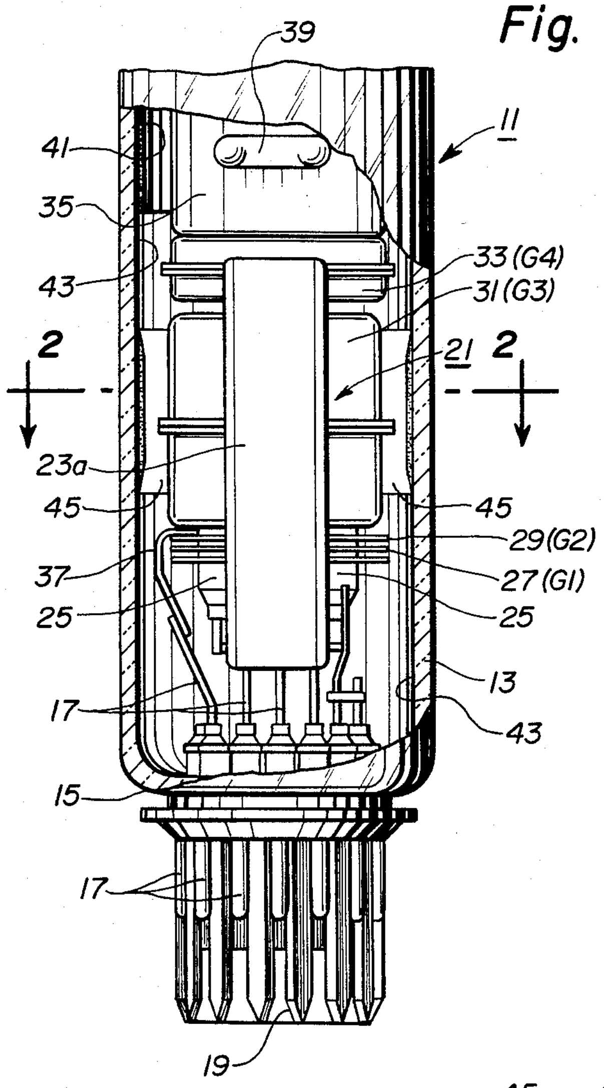
FIG. 1 is a broken-away, front, elevational view of the neck of a novel CRT having an internal neck coating of doped tin oxide according to the invention.
Figure 2:
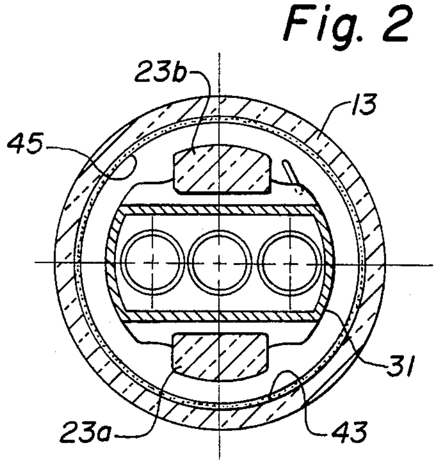
FIG. 2 is a sectional view along section line 2—2 through the neck of the CRT shown in FIG. 1.

FIGS. 1 and 2 show structural details of the neck of a particular shadow-mask-type color television picture tube. The structure of this CRT, which is a rectangular 25 V size tube with 90° deflection, is conventional except for the internal neck coating. The CRT includes an evacuated glass envelope 11 comprising a rectangular faceplate panel (not shown) sealed to a funnel having a glass neck 13 integrally attached thereto. A glass stem 15 having a plurality of leads or pins 17 therethrough is sealed to and closes the neck 13 at the end thereof. A base 19 is attached to the pins 17 outside the envelope 11. The panel (not shown) includes a viewing window which carries on its inner surface a luminescent viewing screen comprising phosphor stripes extending in the direction of the minor axis thereof, which is the vertical direction under normal viewing conditions.

An in-line beaded bipotential electron-gun mount assembly 21, centrally mounted within the neck 13, is designed to generate and project three electron beams along coplanar convergent paths to the viewing screen. The mount assembly 21 comprises first and second glass support rods or beads **23*a* and 23*b* respectively from which the various electrodes are supported to form a coherent unit in a manner commonly used in the art. These electrodes include three substantially equally transversely spaced coplanar cathodes (one for producing each beam) housed in three cathode sleeves 25, a control-grid electrode (also referred to as G1) 27, a screen grid electrode (also referred to as G2) 29, a first accelerating-and-focusing electrode (also referred to as G3) 31, a second accelerating-and-focusing electrode (also referred to as G4) 33, and a shield cup 35, longitudinally spaced in that order by the beads 23*a* and 23*b*. The various electrodes of the mount assembly 21 are electrically connected to the pins 17 either directly or through metal ribbons 37. The mount assembly 21 is held in a predetermined position in the neck 13 on the pins 17 and with snubbers 39 which press on and make contact with an electrically-conductive internal funnel coating 41 on the inside surface 43 of the neck 13. The conductive funnel coating 41 extends over the inside surface of the funnel and connects to the anode button (not shown) and into the neck 13**.

An electrically-conductive neck coating 45 in the form of a circumferential band resides on the inside surface 43 of the neck 13 opposite a portion of the G3. The neck coating 45 is about 10.0 mm wide and about 5000 Å thick, except that the edges are tapered or feathered to zero thickness. The neck coating 45 consists essentially of fluorine-doped tin oxide ($SnO_2$:F) having a resistivity of about $5\times10^{-4}$ ohm-cm, which produces a sheet resistance of about 10 ohms/square in the coating.

Figure 3:
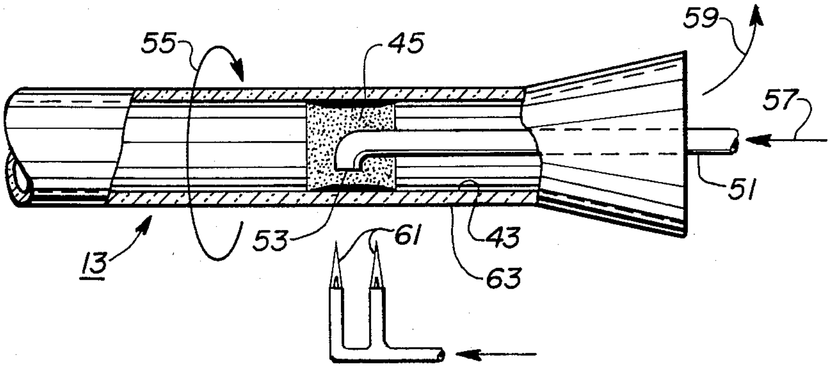
FIG. 3 is a partially-schematic elevational view of an apparatus for producing a doped tin-oxide coating inside the neck of a CRT.

The neck coating 45 may be deposited in situ by CVD (chemical vapor deposition) by the following method which is described with respect to FIG. 3. Before the mount assembly 21 is sealed into the neck 13, the bulb assembly is fixed into the chuck (not shown) of a lathe. An inlet tube 51 having a side nozzle 53 is positioned centrally inside the neck 13 with the nozzle 53 pointed at the portion of the inside surface 43 to be coated. Heat is applied to the outside surface of the neck 13 opposite the nozzle while the neck 13 is slowly rotated (about 25 rpm) as indicated by the arrow 55, and tin tetramethyl $(CH_3)_4Sn$ and bromo trifluoromethane $CF_3Br$ in a nitrogen-and-oxygen carrier gas is passed through the stationary inlet tube 51 as indicated by the arrow 57, out the nozzle 53 and against the portion of the inside surface 43 to be coated. Spent gases escape out the open end of the neck as indicated by the arrow 59. Fluorine-doped tin oxide deposits in situ as a coating 45 on those areas which are hotter than about 380° C. with the thickness thereof generally being a function of the temperature profile at the surface 43 above the threshold temperature of about 380° C. Since the temperature profile tapers at the edges, so does the thickness of the coating 45. Since the neck 13 is rotating, the tin-oxide coating 45 deposits as a circumferential band whose width is determined by the temperature profile at the inside surface 43 of the neck 13. In this example, heat is applied from two pointed gas flames 61 which are directed almost tangentially on opposite sides of the outer surface 63 of the rotating neck 13. Other means for heating the neck in a controlled manner may also be used. After the desired thickness of coating 45 has been deposited, the neck is cooled in the presence of air and the bulb assembly removed from the lathe. The mount assembly is slid into position in the neck and sealed therein at the stem 15. It is noteworthy that the coating 45 is both abrasion-resistant and adherent to the glass neck 13 so that it is not scratched or displaced as the snubbers 39 slide thereover.

Figure 4:
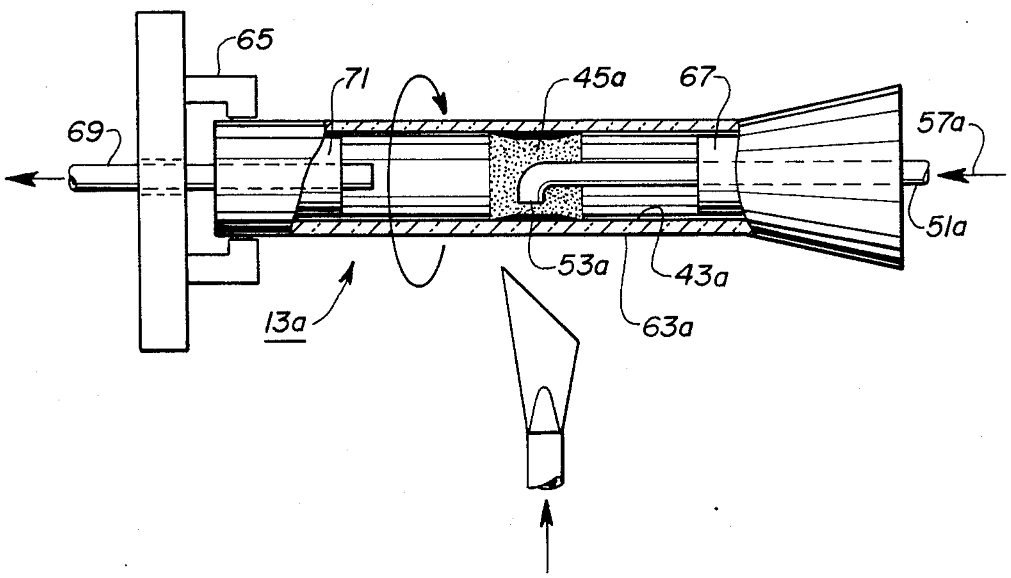
FIG. 4 is a partially-schematic elevational view of another apparatus for producing a doped tin-oxide coating inside the neck of a CRT.

In another procedure, the electrically-conductive neck coating **45*a* is deposited on the inside surface 43*a* of the neck 13*a* before the neck is sealed into the funnel of this tube in the glass factory. As shown in FIG. 4, the neck 13*a* is mounted in the chuck 65 of a lathe with an inlet tube 51*a* feeding in one end of the neck 13*a* through a first stopper 67 and an outlet tube 69 feeding out of the other end of the neck 13*a* through a second stopper 71. The end of the inlet tube 51*a* terminates in a stationary nozzle 53*a* which is pointed at the portion of the inside neck surface 43*a* to be coated to produce a structure similar to the structure shown in FIG. 3. Heat is applied to the portion of the neck 13*a* opposite the nozzle 53*a*. The procedure is essentially the same as that described above with respect to FIG. 3; that is, reactant gases are fed through the stationary inlet tube 51*a* as indicated by the arrow 57*a*, and heat is applied to the outside surface 63*a* of the tube while the neck 13*a* rotates until the desired thickness of neck coating is produced. Then, the heating and gas flow are stopped and the neck is cooled. Then, the neck 13*a* is sealed to the funnel and the subassembly shipped to the tube factory for assembly into a cathode-ray tube. It is note-worthy that the coating 45*a*** is chemically stable and thermally inert so that it can resist the normal cleaning agents, such as hydrofluoric acid, and thermal cycles involved in cathode-ray tube manufacture.

GENERAL CONSIDERATIONS AND ALTERNATIVES

The invention may be applied generally to cathode-ray tubes comprising an evacuated glass envelope and an electron gun mount assembly housed in said envelope, wherein the electrodes of the mount assembly are confined by closely-spaced glass surfaces. In such structures, arcing occurs in and around electrodes of the mount assembly during the operation of the tube. An electrically-conductive tin-oxide coating, according to the invention, on the glass surfaces opposite at least portions of the electrodes carrying high voltage relative to ground potential will suppress such arcing. Preferably, the coating is opposite portions of the high-voltage electrode nearest the low-voltage electrodes.

The electrically-conductive tin-oxide coating 45 of the CRT shown in FIGS. 1 and 2 has the effect of suppressing blue glow and flashovers and also suppressing the generation of electrically-insulative particles which originate from the neck glass. The electrically-conductive coating is in the form of a smooth, substantially-continuous, crystalline film of tin oxide which may be a circumferential band or may be patches opposite the glass beads supporting the electrodes of the mount assembly. The electrically-conductive tin-oxide coating is sufficiently thick to provide the desired conductivity in the film and is preferably about 2,000 to 10,000 Angstroms thick. Thicker coatings do no more good electrically and may cause spalling of the glass during the processing of the CRT. Thinner coatings may have too high a resistance. The band or patch is preferably about 10 mm, but may be from about 5 to 15 mm in width or height. The band or patch should have feathered or tapered edges and should be as smooth as possible, so as to minimize sites from which electron emission may occur in the presence of an electrical field. Generally, the coating should be of such smoothness that ordinary features are less than 100 Angstroms and the largest features are not greater than about 700 Angstroms above the principal portions of the surface of the coating.

The electrically-conductive coating can be undoped, in which case the crystal structure of the tin oxide forms spontaneously as stannic oxide $SnO_2$ with oxygen deficiencies. Alternatively the tin-oxide film can be doped with antimony Sb, or fluorine F, or a combination of these dopants. Dopants have the effect of reducing the electrical resistance of the tin-oxide film and thereby permit thinner films to be used. Generally, the concentration of dopant is in the range of 0.001 to 1.0, preferably about 0.5, mol percent of the mols of tin oxide present. The preferred dopant is fluorine which substitutes for a portion of the oxygen present. The atomic ratio of fluorine to oxygen in fluorine-doped tin oxide is preferably about 0.01 to 0.02. This F/O atomic ratio may be as low as 0 and as high as the saturation of fluorine in the tin oxide. Antimony, as a dopant, substitutes for a portion of the tin present. The atomic ratio of Sb/Sn is preferably about 0.005.

It is not understood why a film of tin oxide, either as a circumferential band or as patches opposite glass surfaces, should suppress blue glow in the glass and arcing in and around the mount assembly. Measurements have shown that the presence of the electrically-conductive tin-oxide coating reduces the build-up of charge on the inside of the glass surfaces opposite the electrodes during the operation of the tube. Again, this has not been explained, and no theory for the phenomenon is available. It is believed that the electrically-conductive coating should have a resistance of less than $10^4$, and preferably about 10, ohms per square. This can be achieved with tin oxide having a resistivity of less than $10^{-2}$ ($100\times10^{-4}$) ohm-cm and preferably about $5\times10^{-4}$ ohm-cm.

The electrically-conductive coating can be made in situ by any process known to produce tin-oxide films. Preparation by CVD (chemical vapor deposition) is preferred because it produces coatings that are smoother, more abrasion resistant and more strongly adherent to glass than most processes for making tin-oxide films. Particular CVD processes that are preferred are disclosed in U.S. Pat. Nos. 3,949,146, issued April 6, 1976, and 4,265,974, issued May 5, 1981, to R. G. Gordon. In those methods, as in the above-described examples, a reactant gaseous mixture of an organo-metallic compound of tin and at least one dopant in an oxidizing carrier atmosphere is passed over the surface of a glass part to be coated, with the surface having a temperature above a lower threshold reaction temperature. That lower threshold reaction temperature is about 380° C. The surface to be coated may have an upper temperature limitation of up to about 600° C. depending upon the softening temperature of the glass part. In the above-described examples, each of the necks 13 and 13*a* is of a lead glass which has a softening temperature of about 470° C. In view of these softening temperatures, the preferred reaction temperature should be below about 450° C. so that distortions in the neck may be avoided.

In a CVD method of deposition, the concentration of dopant in the electrically-conductive tin-oxide coating is controlled by controlling the concentration of the dopant in the reactant gaseous mixture. Generally, the dopant concentration in the gaseous mixture is about 100 parts per million mol parts of tin to produce a corresponding concentration in the doped tin-oxide coating. Any carrier gas can be used. Air or a controlled mixture of oxygen and nitrogen is preferred since they are relatively low in cost and are readily available. The source compounds of the tin and the dopants may be introduced into the carrier gas by bubbling the carrier gas through the compounds as liquids and controlling the temperatures, and therefore the vapor pressures, of the liquids. Some suitable volatile organo-metallic sources of tin are tin tetramethyl and trimethyl-trifluoromethyl tin. Some suitable and volatile organic sources of fluorine dopant are freon bromo-trifluoromethane and trimethyl-trifluoromethyl tin. A suitable organo-metallic source of antimony dopant is trimethyl antimony.

Some important features of the novel method are as follows:

1. The deposition methods can be compatible with other steps in manufacturing a CRT. The electrically-conductive tin-oxide coating can be deposited on the neck glass by a variety of techniques before butt sealing into the funnel, or alternatively the tin-oxide coating can be deposited on the neck of a CRT bulb assembly just prior to sealing the mount assembly into the CRT. The coating can be produced at any intermediate stage between, if desired.

2. The tin-oxide coating is chemically and thermally inert so that it is not damaged by cleaning agents or other chemicals such as hydrofluoric acid vapor or by thermal cycles involved in the normal manufacturing steps for a CRT.

3. The tin-oxide coating is hard and strongly adherent to a glass surface so that it is not damaged by the snubbers or other abrasive agents during the manufacture of the CRT.

4. The tin-oxide coating is highly conductive electrically, and therefore relatively thin coatings are adequate for the suppression of arcs during the operation of a CRT.

5. The CVD process for depositing the electrically-conductive tin-oxide coating can be controlled to produce a desired thickness. The CVD process inherently produces edges that are tapered; that is, graded in thickness and a surface that is relatively smooth, thereby insuring that sources of electron emission are minimized.

What is claimed:

1. In a cathode-ray tube comprising an evacuated glass envelope, an electron-gun mount assembly housed in said envelope, electrodes of said mount assembly being confined by closely-spaced glass surfaces, and an electrically-conductive coating on said glass surfaces opposite electrodes of said mount assembly, the improvement wherein said coating is a smooth film consisting essentially of crystalline tin oxide, and is floating electrically.

2. The tube defined in claim 1 wherein said coating is in the form of a circumferential band on the inner surfaces of a glass neck around said mount assembly, said neck being an integral part of said envelope.

3. The tube defined in claim 1 wherein said coating consists essentially of fluorine-doped tin oxide.

4. The tube defined in claim 1 wherein said coating material is formed in situ from a tin compound in vapor form.

5. The tube defined in claim 1 wherein said film of tin oxide has a resistivity less than $10^{-2}$ ohm-centimeter.

6. The tube defined in claim 1 wherein said film is tapered toward at least one edge thereof in such manner as to minimize electron emission therefrom in the presence of an electric field.

7. The tube defined in claim 1 wherein said film is located on the inner surface of said envelope opposite and spaced from an electrode which participates in focusing at least one electron beam during the operation of said tube.

8. The tube defined in claim 1 wherein said envelope includes a glass neck, and said electrically-conductive coating is a definitive circumferential band on the inner surface of said neck opposite an electrode of said mount assembly which carries a high voltage during the operation of said tube.

9. The tube defined in claim 1 wherein the largest features of the surface of said coating are less than about 700 Angstroms above the principal portions of said surface.

* * * * *